United States Patent [19]
Hikosaka et al.

[11] Patent Number: 4,957,545
[45] Date of Patent: Sep. 18, 1990

[54] SMELTING REDUCTION PROCESS USING REDUCING GAS GENERATED IN PRECOMBUSTOR

[75] Inventors: Akihide Hikosaka, Mishima; Tsuyoshi Mimura, Kobe; Tomio Suzuki, Kobe; Takeo Yoshigae, Kobe; Shuzo Itoh, Kobe, all of Japan

[73] Assignee: Kabushiki kaisha Kobe Seiko Sho, Kobe, Japan

[21] Appl. No.: 302,612

[22] Filed: Jan. 27, 1989

[30] Foreign Application Priority Data

Jan. 29, 1988 [JP] Japan .................................. 63-20168

[51] Int. Cl.$^5$ ............................................. C21B 11/08
[52] U.S. Cl. ........................................ 75/501; 75/532; 75/502
[58] Field of Search ...................... 75/38, 40, 43, 44 R, 75/44 S, 91, 48; 266/160, 901

[56] References Cited

U.S. PATENT DOCUMENTS

| 2,040,651 | 5/1936 | Frankl ..................................... 75/40 |
| 4,220,469 | 9/1980 | Tippmer ................................... 75/34 |
| 4,309,024 | 1/1982 | Lillybeck et al. .................... 266/160 |
| 4,381,938 | 5/1983 | Claflin ..................................... 75/42 |

Primary Examiner—Melvyn J. Andrews
Attorney, Agent, or Firm—Oblon, Spivak, McClelland, Maier & Neustadt

[57] ABSTRACT

Described herein is a smelting reduction process for smelting and reducing an iron oxide material by introducing same into a smelting reduction furnace together with a solid carbonaceous material, a fluxing agent and an oxygen-containing gas, process comprising: subjecting part or all of the solid carbonaceous material to primary combustion using an oxygen-containing gas with an oxygen content corresponding to a theoretical air ratio of 0.4 to 0.9: separating the resulting reducing gas from combustion residue of the solid carbonaceous material; and introducing the reducing gas into a smelting reduction furnace to effect secondary combustion with supply of a separately introduced oxygen-containing gas for smelting and reducing said iron material.

8 Claims, 14 Drawing Sheets

SMELTING REDUCTION PROCESS USING REDUCING GAS GENERATED IN PRECOMBUSTOR

BACKGROUND OF THE INVENTION

1. Field of the Invention

This invention relates to a smelting reduction process for producing molten iron from an iron oxide material, by feeding an iron oxide material such as iron ore and prereduced iron to a smelting reduction furnace along with solid carbonaceous material, a fluxing agent and an oxygen-containing gas for smelting reduction, and more particularly to a smelting reduction process which can reduce slag production to a marked degree to lessen the operational load of smelting reduction furnace and permits production of high quality molten iron of low phosphorus and sulfur contents.

2. Description of the Prior Art

As iron-making technology other than blast furnace processes, the so-called smelting reduction process has come into the limelight, urging developments of various processes in this connection, including COREX process, XR process, SC process, COIN process etc.

Generally in iron-making by the smelting reduction process, a CO-dominant hot gas which is generated in a smelting reduction furnace is fed to a prereduction furnace as a heat source and at the same time as a reductant to produce prereduced iron with low or, if necessary, high prereduction degree in the prereduction furnace, while adding carbonaceous material and blowing oxygen-containing gas into the smelting reduction furnace to supply heat thereto and melting and finally reducing the prereduced iron which is being supplied from the prereduction furnace.

The prior art concerning such smelting reduction process includes: (1) A process of charging prereduced iron from a prereduction furnace to a smelting reduction furnace, blowing coal and oxygen into an iron bath held in the smelting reduction furnace to smelt and reduce the iron ore while burning part of the generated gas on the bath (post-combustion), and reforming the gas drawn off the smelting reduction furnace before introducing same into the prereduction furnace (Japanese Laid-Open Patent Application No. 59-222508); (2) A process of preheating iron ore, prereducing the preheated iron ore in a prereduction furnace, blowing the prereduced iron ore into a smelting reduction furnace along with a carbonaceous material, oxygen and a fluxing agent thereby secondarily burning part of the fuel and heating the iron bath produced in the smelting reduction furnace, while simultaneously cooling and decarbonating the produced reducing gas to adjust its oxidation degree before introducing same into the prereduction furnace for control of the prereduction rate (Japanese Laid-Open Patent Application No. 60-145307); and (3) A process which is slightly different in principles from the just-mentioned two prior art processes and which employs a converter (an iron bath type smelting reduction furnace) without a prereduction furnace, obtaining pig iron by adding agglomerates of iron ore and a carbon source and quicklime to the converter together with oxygen blowing (Japanese Patent Publication No. 57-40883).

The present inventors disclosed "Method and Apparatus for Blowing Solid Fuel into Electric Furnace or Converter" in our prior application, Japanese Laid-Open Patent Application No. 62-267407.

(a) The invention of this prior application concerns an improvement in power consumption in electric furnaces and low-cost heat compensation in converters, namely, it is restricted to an auxiliary measure of replacing part of the processing heat source by a solid fuel and applicable in a different range from that of the present invention related to the smelting reduction process.

(b) Although the process of the above mentioned prior application is directed specifically to electric furnaces and converters, the present invention is not restricted to the furnaces of these types.

(c) The product of the process in the prior application is molten steel, while the product of the present invention is molten iron, especially molten iron with a carbon concentration higher than 2%.

(d) The present invention combines desulfurization in a precombustor to solve the problems resulting from the use of solid carbonaceous material, permitting to produce molten iron of high quality. This is because the problem of S is important in the present invention where a carbonaceous material as mentioned in (a) above is used in a wide range (i.e., in a larger amount).

Further, we have filed a patent application (Japanese Laid-Open Patent Application No. 63-28818 for "Method and Appratus for Blowing Fuel into Electric Furnace & Converters". In this prior application, the fuel is burned completely outside a furnace, and the exhaust gas is injected against the raw material in the electric furnace or converter, without the concept of primary and secondary combustins as in the present invention.

We have also filed a patent application (Japanese Laid-Open Patent Application No. 63-72814) for "Electric Furnace Steel Making Process". As the title implies, this application is directed to a process by electric furnace into which combustion exhaust gas is blown similarly to the just-mentioned prior application, likewise without the concept of primary and secondary combustion as in the present invention.

In the smelting reduction iron making processes, particularly in the smelt reduction furnace operations as mentioned in (1) and (2) above, it is necessary to add a large amount of fluxing agents such as limestones and burnt lime for removal of the sulfur and phosphorus brought in mainly by the solid carbonaceous material and the iron ore, for suppression of slag foaming and for protection of the refractory material of the furnace. Namely, these fluxing agents function as desulfurizer, dephosphorizer and a coolant which prevents slag foaming, and from the standpoint of promoting the desulfurizing and dephosphorizing reactions, the fluxing agent has an important role as a basicity adjusting agent.

3 to 13% of gangue content in the iron oxide material like iron ore and 5 to 15% of ash content in the solid carbonaceous material are mostly constituted by silica, and acidic component, in contrast to an extremely small basic content. Therefore, the slag has a trend toward the acidic side, and, in order to form a basic slag by counteracting this trend, it is necessary to charge a large amount of basic fluxing agent. This naturally increases the amount of slag and the load of the smelting reduction furnace operation to a considerable degree.

FIG. 4 shows the secondary combustion rate in the iron bath type smelting reduction furnace in relation with coal and lime consumptions and the amount of slag, giving the figures in those cases where the basicity was adjusted in such a manner as to hold the S concentration in molten iron at 0.15% to lessen the load in the subsequent desulfurization and refining stages. As clear therefrom, increases of secondary combustion ratio causes drop in coal feed and accordingly by decreases in S and ash which are supplied mainly by coal and drops in lime feed and amount of slag. However, as indicated by * in the same figure, the amount of slag reaches 200 kg/T even under a relatively low load condition of the smelting reduction furnace operation where metallization of the prereduced iron is 70% and post-combustion ratio is 25%, producing an extremely large amount of slag as compared with ordinary converter operations.

Further, in a process using a system having a smelting reduction furnace directly coupled with a prereduction furnace (hereinafter referred to as "once-through system"), the amount of slag at a balancing point of operation becomes, for example, greater than 300 kg/T as seen in FIG. 14, giving rise to problems to be solved, namely, problems such as an increase in consumption of the refractory material of the smelting reduction furnace, a drop in the iron yield and an increase of the volumetric furnace capacity for securing the freeboard.

In most of the above-mentioned smelting reduction furnaces, a large amount of pulverized coal is injected into the molten iron bath. Therefore, the bottom blowing equipments which serve for this purpose, including the bottom blowing tuyeres, pipings and refractory materials around the tuyeres, considerably increase the burden of maintenance.

Further, the quality of the ultimate iron product is a serious problem exists in the quality of the iron product of the prior art processes in which a solid carbonaceous material is directly introduced into a smelting reduction furnace. Namely, the P and S levels in the molten iron which is produced in the smelting reduction furnace are determined by the P and S contents in the feed to the furnace minus the P and S contents which are discharged out of the molten iron along with the slag. However, it is difficult to remove both P and S efficiently by way of the slag. In order to have high dephosphorization capacity, it is necessary for the slag to be high in basicity and ozygen potential. On the other hand, in order to have high desulfurization capacity, it is necessary for the slag to be high in basicity and low in oxygen potential. High basicity of slag is effective for both dephosphorization and desulfurization but it has limitations in view of the following problems: the slag will have a higher melting point with lower fluidity which makes its discharge from the furnacce difficult; the basic fluxing agent such as limestone will have to be used in a large amount; and as a result the amount of slag will be increased to lower the operating efficiency. Thus, there are limitations on the degree to which the slag can be improved with respect to both dephosphorization and desulfurization. The slag is superior in dephosphorization but inferior in desulfurization or vice versa depending upon its oxygen potential. For example, in case of a low shaft type smelting reduction furnace packed with a carbonaceous material or a conventional blast furnace process, it is possible to obtain low oxygen potential (e.g., about 0.5% of FeO concentration in slag). Therefore, the S level in molten iron shows a relativeluy low value of 0.04%, but the P level reaches an extremely high value of 0.08–0.12%, increasing the dephosphorization load in the refining process in a converter or the like. On the other hand, in case of a converter type iron bath smelting reduction furnace, for example, the oxygen potential of slag becomes relatively high, so that it is possible to hold the P level as low as about 0.02%, but the S level reaches a value greater than 0.1% and in some cases reaches about 0.3%. Therefore, a large load is imposed for desulfurization of the molten iron, which is a negative factor to the production cost. Thus, the smelting reduction process which directly uses a solid carbonaceous material invariably has a serious problem with regard to either the P level or S level of the molten iron.

SUMMARY OF THE INVENTION

With the foregoing situations in view, it is an object of the invention to provide a smelting reduction process which can reduce the consumption of fluxing agent and the production of slag in smelting reduction furnace operations to a significant degree and which can markedly lessen the operational load of smelting reduction furnace, while permitting to produce high quality molten iron with low phosphorus and sulfur contents.

In accordance with the present invention, the foregoing objects are achieved by the provision of a smelting reduction process in which an iron oxide material, a solid carbonaceous material, a fluxing agent and an oxygen-containing gas are introduced into a smelting reduction furnace for smelting and reducing the iron oxide material, the process comprising: subjecting part or all of the solid carbonaceous material to primary combustion by means of an oxygen-containing gas with an oxygen concentration corresponding to an air ratio of 0.4–0.9; separating the resulting reducing gas from combustion residues of the solid carbonaceous material; introducing the reducing gas into the smelting reduction furnace to effect secondary combustion with supply of a separately introduced oxygen-containing gas for smelting and reducing the iron oxide charge. According to an aspect of the invention, a Ca-containing substance is added at the time of primary combustion to desulfurize the produced reducing gas and the basicity of and FeO concentration in the slag produced in the smelting reduction furnace are controlled during the smelting reduction process.

DETAILED DESCRIPTION OF THE INVENTION

Figure 1:
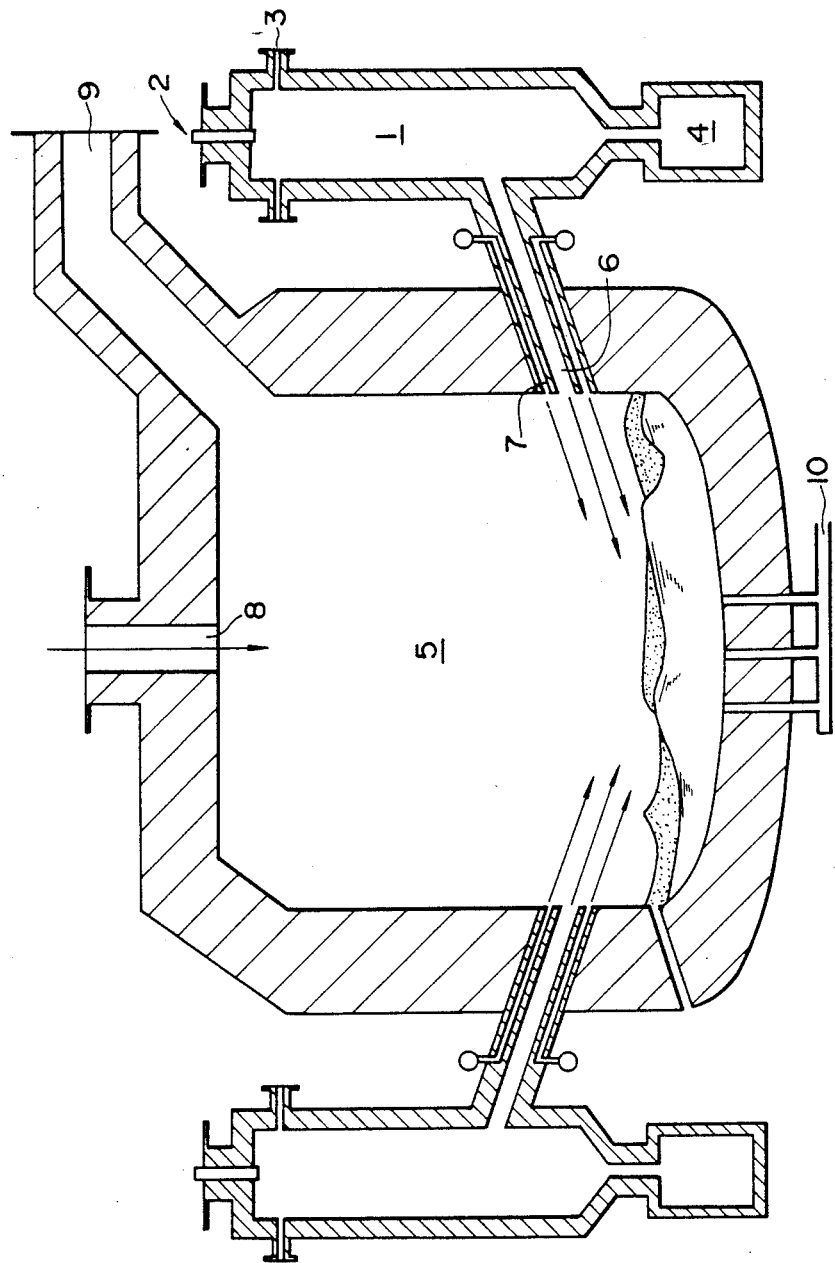
FIG. 1 is a schematic illustration of a smelting reduction furnace employed for carrying out the process of the present invention.

Illustrated schematically in FIG. 1 is an example of the apparatus employed for carrying out the process of the present invention, the apparatus including a precombustor 1 which is provided with an injection hole 2 for blowing in solid carbonaceous material and an injection hole 3 for blowing in oxygen, steam and the like. The precombustor 1 is further provided with a ash collecting pot 4 in a lower portion thereof. The precombustor 1 is connected to a smelting reduction furnace 5 through a hot gas blowing hole 6. The smelting reduction furnace 5 is provided with an injection hole 7 for blowing in oxygen for secondary combustion, an inlet hole 8 for charging iron oxide material, an exhaust gas outlet 9 and, if necessary, injection holes 10 for replenishing carbonaceous material.

When carrying out the present invention by the use of this apparatus, a solid carbonaceous material and oxygen are blown into the precombustor 1 to effect primary combustion prior to combustion in the smelting reduction furnace 5. In this instance, the burned solid carbonaceous material which mainly consists of ash can be separated from the produced gas, for example, by blowing an oxygen-containing gas into the precombustor to form therein swirls or vortex as described in our copending application (Laid-Open Patent Application No. 62-267407), separating the ash toward the peripheral walls of the precombustor by the swirling gas or by its centrifugal force and letting same drop along the wall surface into the lower pot 4.

Figure 2:
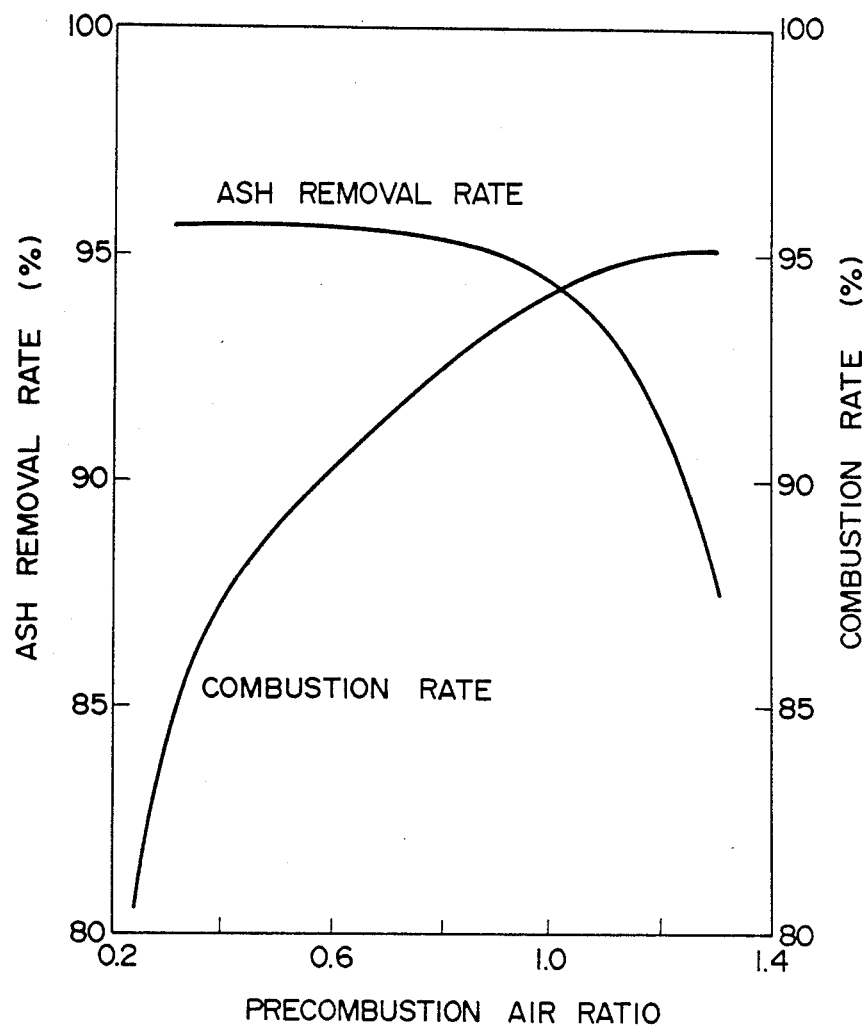
FIG. 2 is a diagram showing precombustion air ratio in relation with ash removal rate and combustion rate.

In the present invention, it is a requisite of utmost importance to control the amount of the introducing oxygen-containing gas such that the condition of combustion in the precombustor has an air ratio of 0.4–0.9. Namely, as seen in FIG. 2, a diagram showing the relationship of the air ratio with ash removal rate (the rate of removal of ahs content in the solid carbonaceous material in the precombustor) and combustion rate (the rate of conversion by combustion of carbon content in the solid carbonaceous material into CO and $Co_2$), the combustion rate measured at the outlet of the precombustor (at the hot gas blowing port 6) exhibits a sufficient value at an air ratio above 0.4, inclusive, and reaches a maximum value at an air ratio of about 1.2, abruptly decreasing when the air ratio exceeds 1.5. On the other hand, an ash removal rate of about 95% can be obtained at an air ratio smaller than 0.7. However, it tends to diminish at larger air ratios, showing a sharp drop at an air ratio greater than 0.9. This is because the air velocity in the precombustor is increased at greater air ratios, reducing the residence time of particles and letting particles of small mass to go out of the precombustor without being trapped therein.

Figure 3:
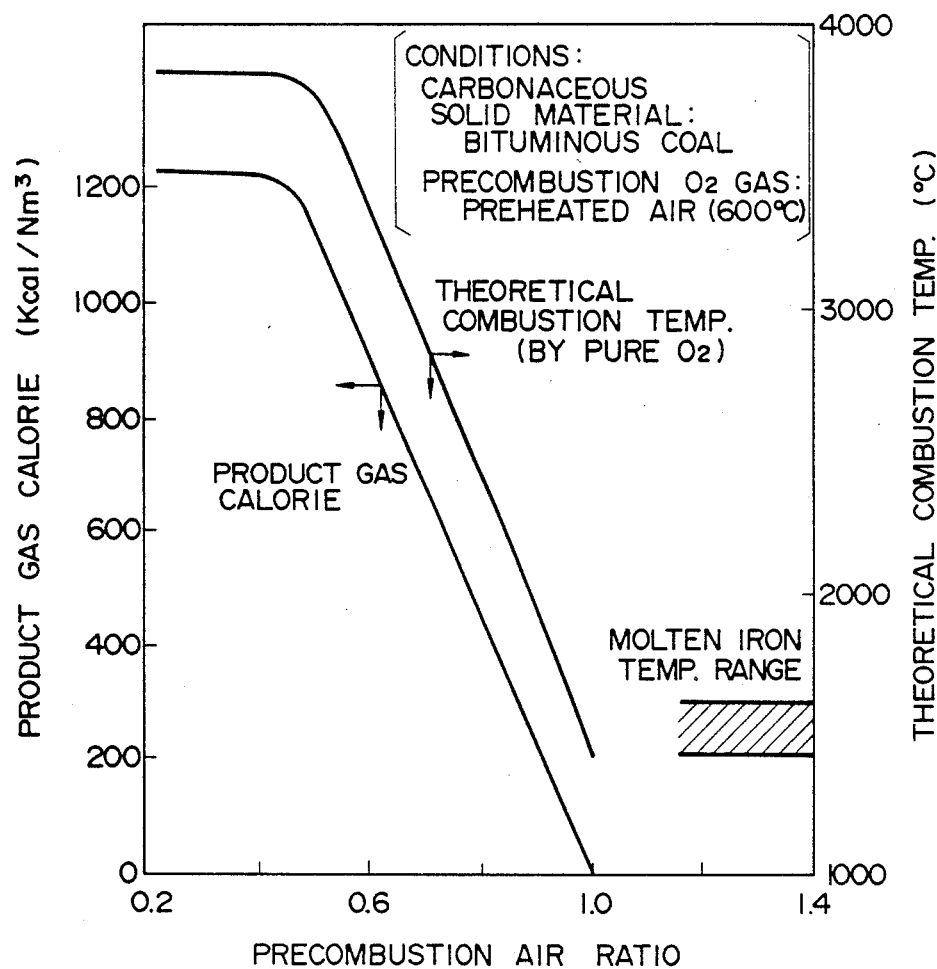
FIG. 3 is a diagram showing precombustion air ratio in relation with produced gas calorie and theoretical combustion temeperature.
Figure 4:
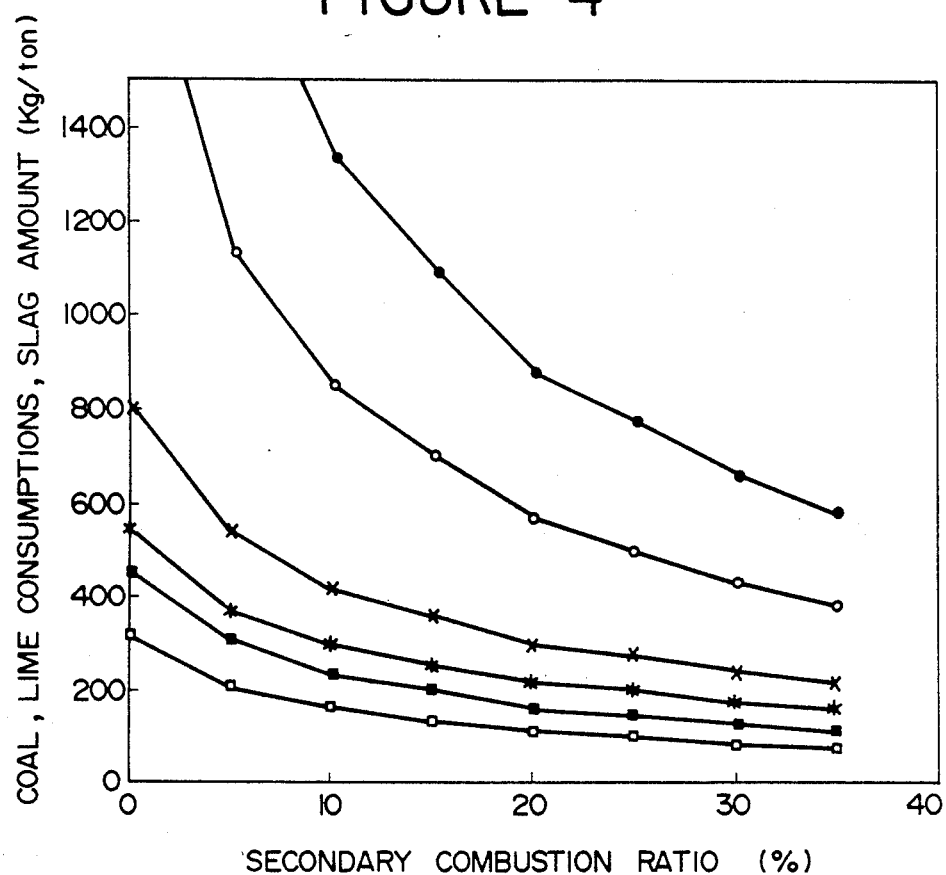
FIG. 4 is a diagram showing secondary combustion ratio in iron bath type smelting reduction furnace in relation with consumptions of coal and burnt lime and amount of slag.

FIG. 3 is a diagram which shows the relationship of the air ratio in the precombustor with the calorific value of the product gas and the theoretical combustion temperature which would be reached in complete combustion using pure oxygen of normal temperature. High air ratios produce a gas of low calorific value and mainly composed of $CO_2$ and $H_2O$, so that the theoretical combustion temperature obtained by secondary combustion in a smelting reduction furnace drops abruptly, making it difficult to smelt and reduce the iron oxide material effeciently.

For the reasons stated above, the air ratio in the primary combustion is limited to 0.4–0.9 in the present invention. To summarize the reasons of this restriction, the combustion rate of the solid carbonaceous material drops abruptly at an air ratio smaller than 0.4, increasing the loss of carbon source due to a marked increase of unburned carbon. On the other hand, with air ratios over 0.9, the ash removal rate shows a sharp drop, as a result increasing the amount of ash which is brought into the smelting reduction furnace, as well as the fluxing agent consumption and slag production. Besides, since the combustion is almost completed in the precombustor, the secondary combustion in the smelting reduction furnace is weakened to lower the heat efficiency in the smelting reduction furnace.

A clean reducing gas which has been stripped of the ash content is obtained from the precombustor in this manner, and it is blown into the smelting reduction furnace 6 through the hot gas blowing hole 8. Therefore, the slag production is reduced to a marked degree as the gangue in the iron oxide material is only the source of slag components which are brought into the smelting reduction furnace. Thus, it becomes possible to reduce the consumption of the fluxing agent required for the desulfurization and dephosphorization treatments and to reduce the slag production to lessen the operational load.

The present invention has the basic configuration as described above, which can be combined with one or more of the following steps or elements to make the most of the effects of the invention for production of molten iron of higher quality.

Figure 5:
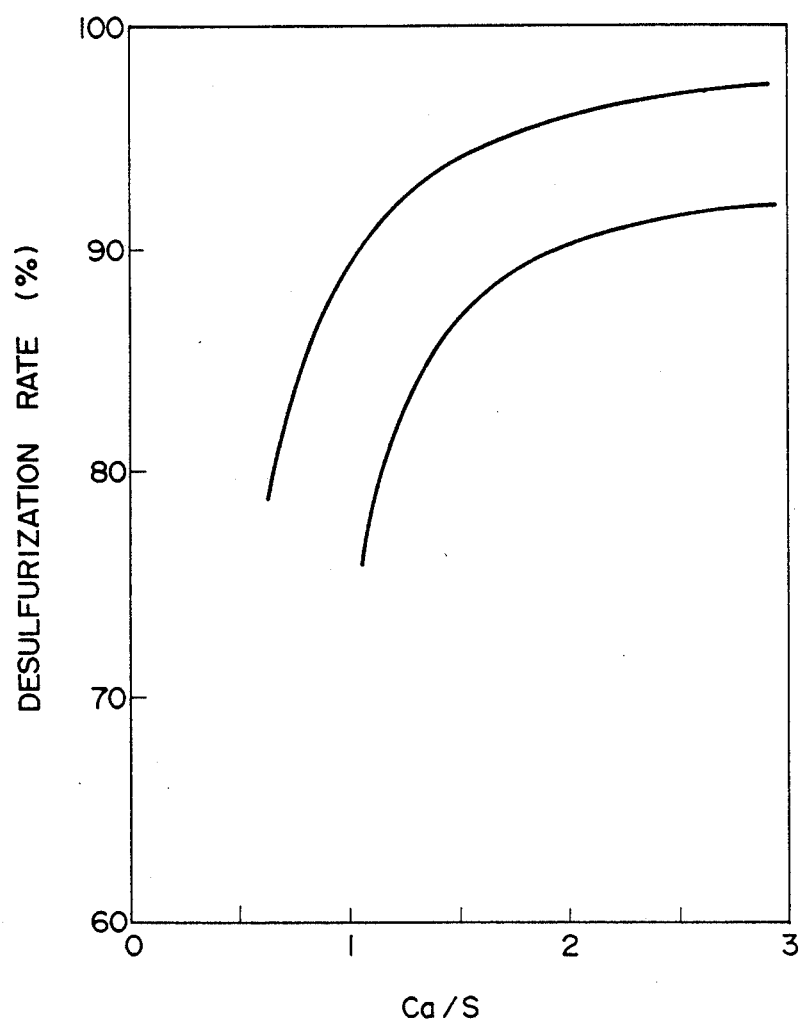
FIG. 5 is a diagram showing Ca/S ratio in precombustor in relation with desulfurization rate.
Figure 6:
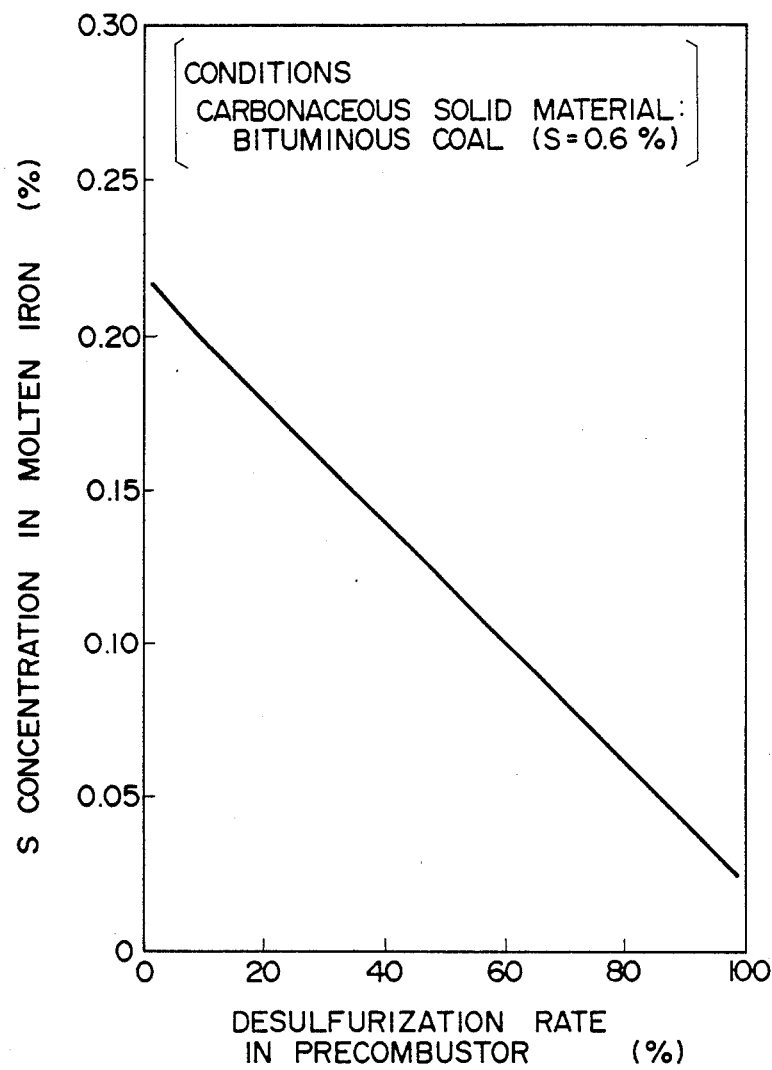
FIG. 6 is a diagram showing the desulfurization rate in precombustor in relation with the S concentration in molten iron.

For removal of the sulfur content, a Ca component such as limestone or burnt lime may be blown into the precombustor together with the solid carbonaceous material. By so doing, the sulfur content in the solid carbonaceous material can be removed for producing molten iron of low S level. This effect is seen in the diagram of FIG. 5 in which the horizontal axis represents the molar ratio (Ca/S) of the sulfur content introduced by the solid carbonaceous material to the calcium content introduced by the desulfurizing agent (limestone, burnt lime or the like) and the vertical axis represents the desulfurization rate [={1-( the sulfur content in produced gas)/(the sulfur content introduced by solid carbonaceous material)}×100]. As clear from FIG. 5, a desulfurization rate higher than 85% can be obtained when the ratio Ca/S is 1 or greater. Accordingly, the sulfur content can be removed in the precombustor by introducing a suitable amount of fluxing agent (a Ca-containing component) like limestone or burnt lime into the precombustor together with solid carbonaceous material for the primary combustion. At this time, the amount of the fluxing agent to be introduced is preferred to be controlled such that the ratio Ca/S fall in the range of from 1 to 3. The desulfurization rate drops abruptly when the ratio Ca/S becomes smaller than 1. The desulfurization effect becomes saturated when the ratio Ca/S exceeds 3, uneconomically increasing only the consumption of the fluxing agent. By effecting desulfurization simultaneously with the primary combustion of the solid carbonaceous material in this manner, the S concentration in the produced gas is reduced, and as a result the S concentration in molten iron can be lowered even when a solid carbonaceous material with a high sulfur content is used as shown in FIG. 6, permitting to omit or lessen the desulfurization treatment of molten iron outside the smelting reduction furnace.

Figure 7:
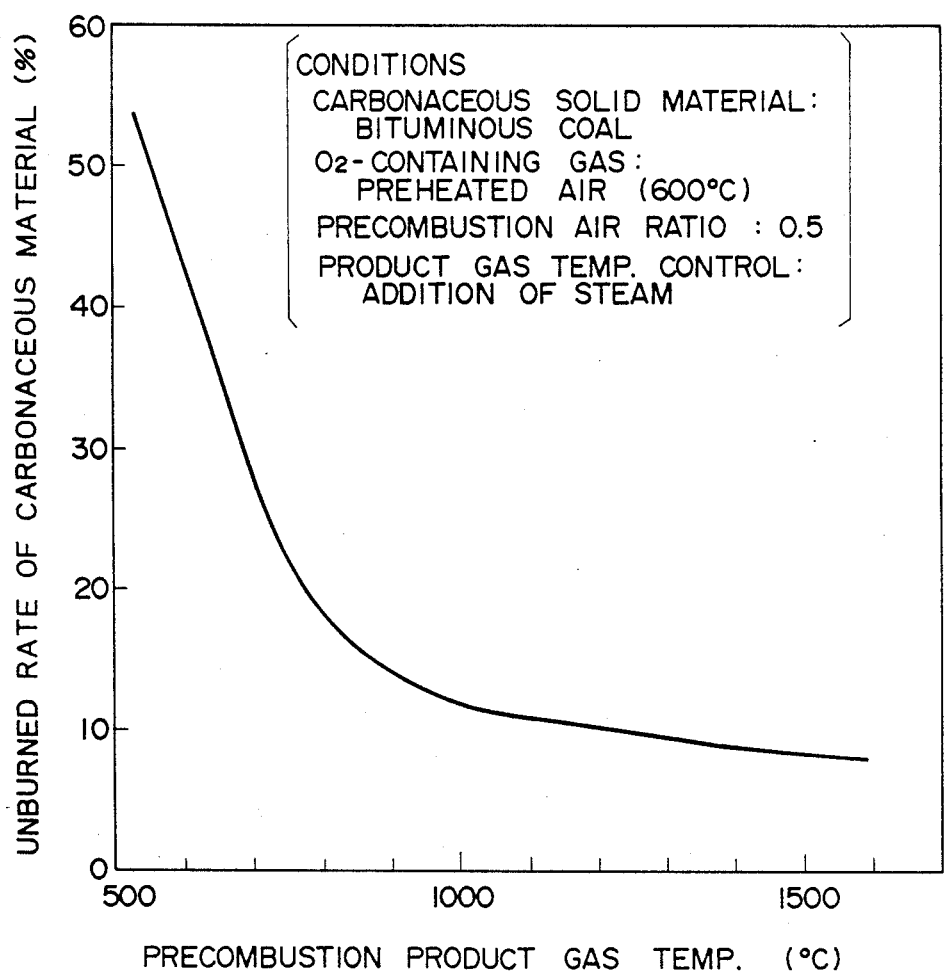
FIG. 7 is a diagram showing the temperature of the product gas in the precombuster in relation with unburned rate.
Figure 8:
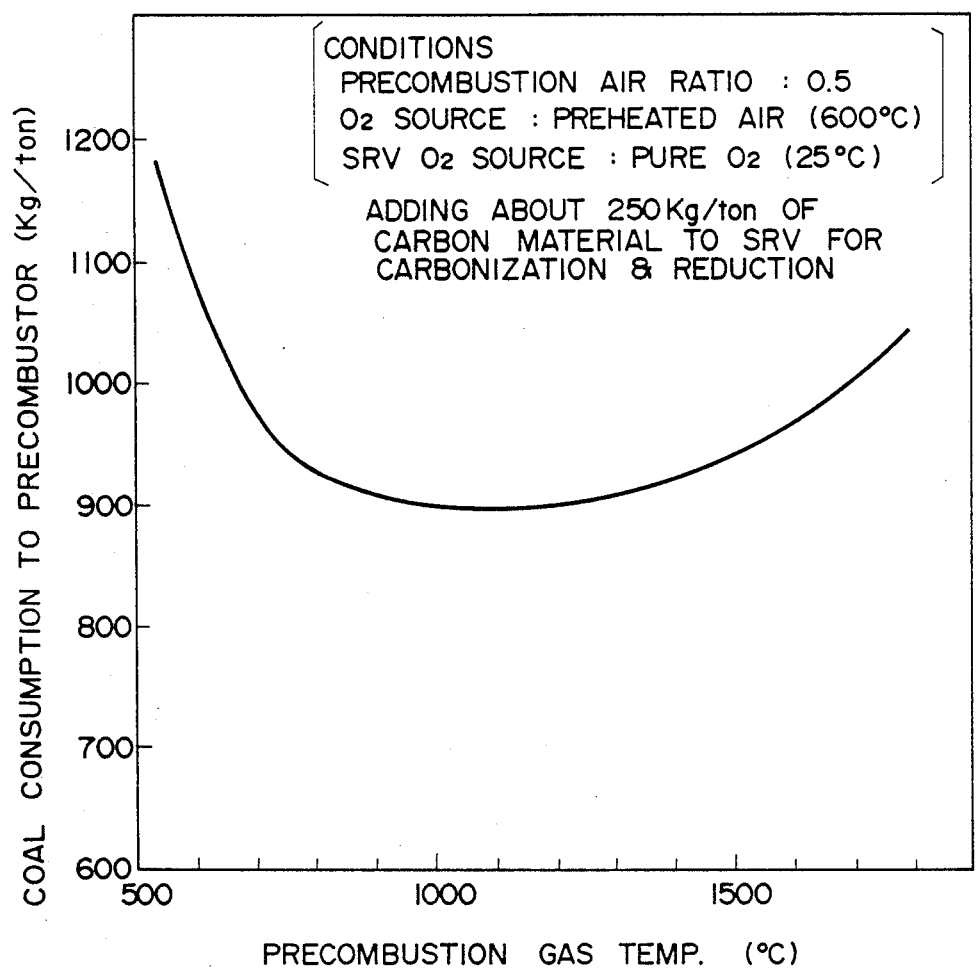
FIG. 8 is a diagram showing the temperature of product gas in the precombuster in relation with the consumption of coal used in the precombustor.
Figure 9:
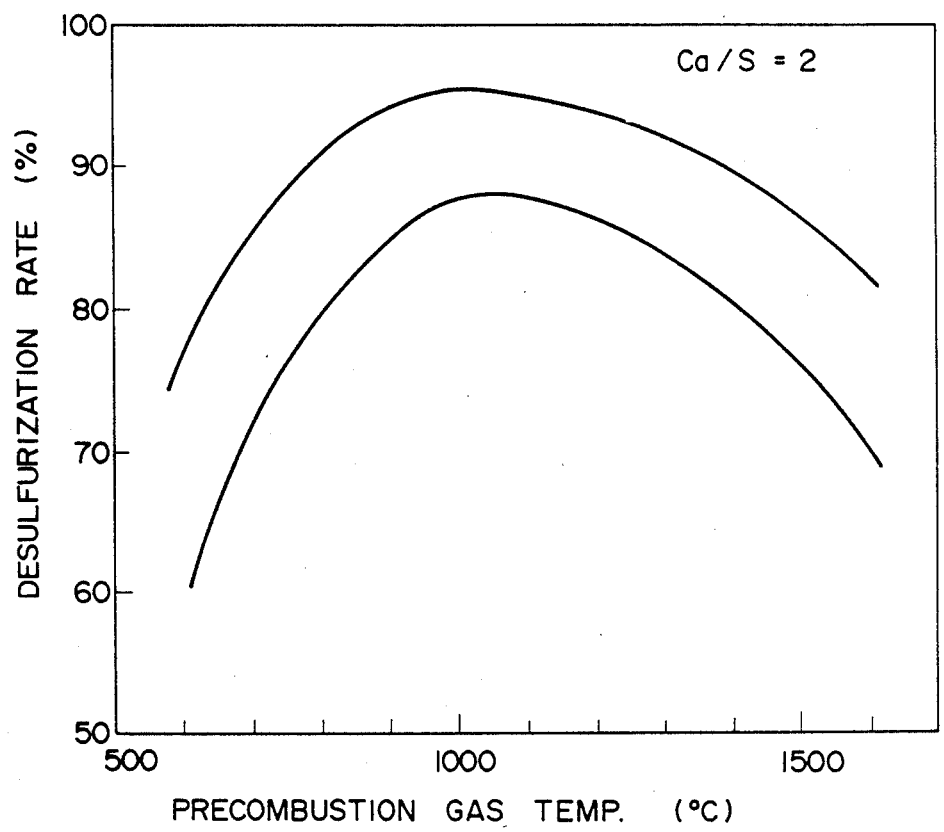
FIG. 9 is a diagram showing the temperature of product gas in the precombuster in relation with desulfurization rate.

In the present invention, the temperature of the reducing gas which is produced in the precombustor 1 is an important factor for enhancing the efficiency of the process as a whole, and therefore it should be controlled to an appropriate range to obtain predetermined effects. Shown in FIG. 7 are variations in rate of carbon (unburned) which is collected in the pot in unburned state, in relation with the product gas temperature in the precombustor 1. When the product gas temperature is at a high level, the solid carbonaceous material undergoed combustion at a high velocity, showing a low unburned rate. However, as the product gas temperature is lowered to 700° to 800° C., the unburned rate is increased to a marked degree, causing a considerable loss of carbon source. On the other hand, when the product gas temperature is at a high level, the heat losses in the precombustor and the conduit leading to the smelting reduction furnace become greater, increasing the consumption of the solid carbonaceous material as shown in FIG. 8 in addition to increased wear of refractory material in the precombustor which will lead to an increase in comsumption of the refractory material. Further, the desulfurization of the product gas by limestone or burnt lime in the precombustor is effected most efficiently at the temperature of about 1000° C. as seen in FIG. 9, and becomes less efficient at either higher or lower temperatures. Therefore, it is important to control the precombustion gas temperature to the range of 700°-1500° C. to produce economically high quality molten iron of low S level using solid carbonaceous material as a heat source.

Such control of the product gas temperature can be made easily by changing the preheating temperature of the oxygen-containing gas for the primary combustion or by changing the oxygen concentration. In this regard, it is also effective to blow steam into the precombustor to induce the following water gasification reaction, an endothermic reaction, by the use of the combustion heat of the carbonaceous material, thereby cooling the product gas while increasing its calorific value.

$$C + H_2O = CO + H_2 \tag{I}$$

In a case where water gas is produced by addition of steam, it becomes necessary to add an oxygen source of a qunatity suitable for burning the gas in the secondary combustion.

Figure 10:
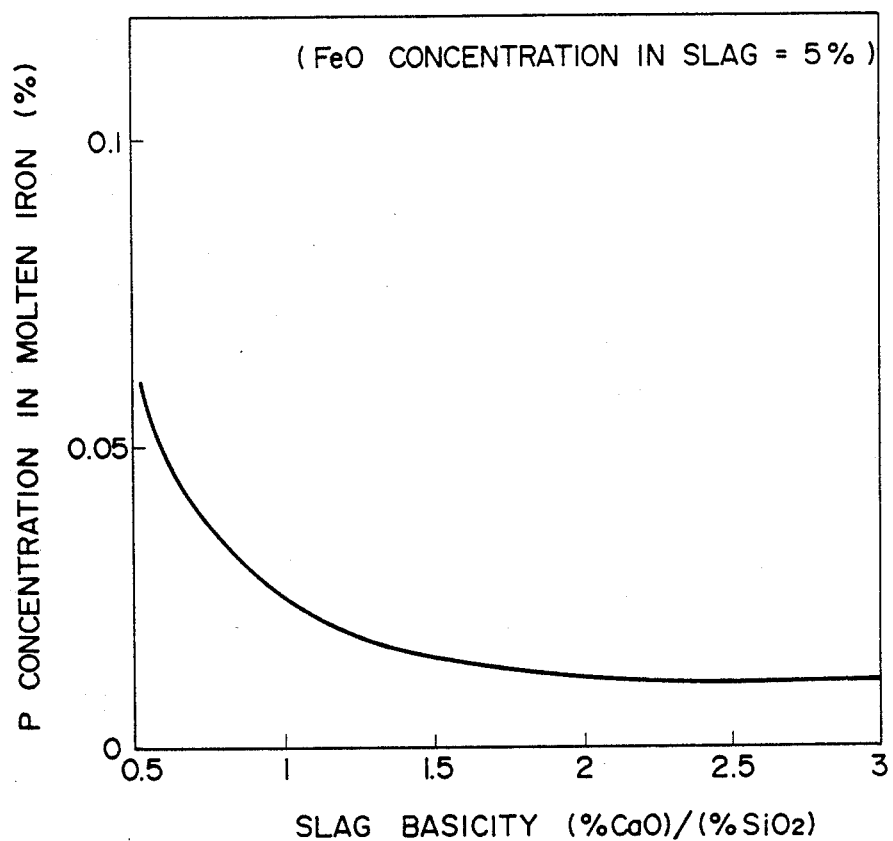
FIG. 10 is a diagram showing the basicity of slag in smelting reduction furnace in relation with P concentration in molten iron.
Figure 11:
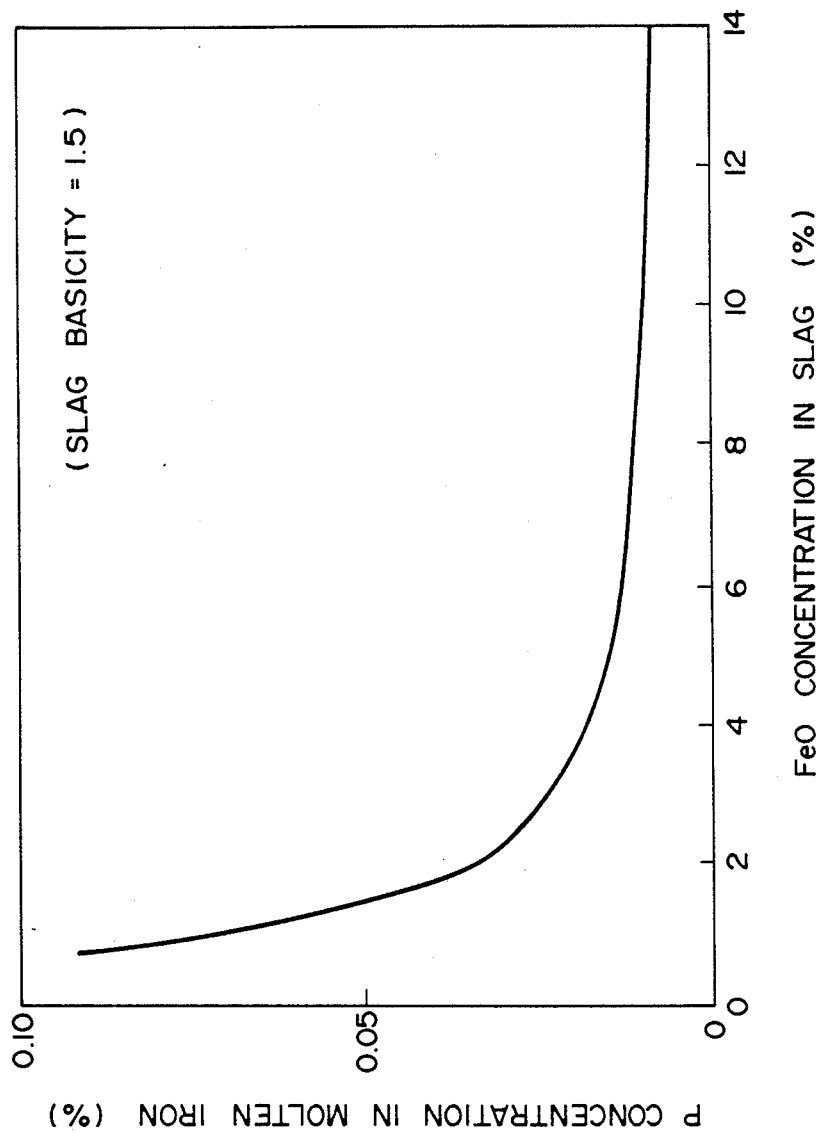
FIG. 11 is a diagram showin FeO concentration in slag in smelting reduction furnace in relation with P concentration in molten iron.

In the process of the present invention where the solid carbonaceous material is subjected to primary combustion and desulfurization and the resulting hot reducing gas is introduced into the smelting reduction furnace, the necessity for desulfurization in the smelting furnace is lessened and accordingly the slag which is formed in the smelting reduction furnace should preferably have properties suitable for dephophorization, namely, high basicity and low oxygen potential. As seen in the diagram of FIG. 10 which shows the relationship of the basicity of the slag with the P concentration in the product molten iron, the P concentration in the molten iron becomes lower at higher basicity and can be held to a low level by having a basicity higher than about 0.8. This effect is saturated at a basicity higher than 2.5. The enhancement of basicity needs a fluxing agent and increases the amount of slag as well as the quantity of sensible heat which is carried away by the slag, giving rise to a negative factor such as an increase in consumption of the carbonaceous material. Therefore, the basicity is desired to be the necessary minimum, more specifically, to be controlled to a range of 0.8 to 2.5 for the reasons stated above. On the other hand, given in FIG. 11 is a diagram showing the P concentration in the molten iron in relation with FeO concentration in the slag as an index of the oxygen potential of the slag. As seen there, the P concentration in the molten iron is reduced as the FeO concentration is increased. However, increases of FeO concentration in the slag are reflected by greater Fe losses and increases in wear of lining refractory material of the furnace by FeO, raising the consumption of the refractory material. It follows that the concentration of FeO should not be increased more than necessary. Gathering from these, the FeO concentration in the slag should be controlled to the range of 2-10% to lessen the burden of dephophorization in the refining stage to a sufficient degree and to stabilize and rationalize the smelting reduction furnace operation.

By putting into practive the above-described process of the present invention, it becomes possible to reduce the consumption of the fluxing agent and slag production in smelting reduction furnace operation to a marked degree, and to lessen the operational burden of the smelting reduction furnace considerably while ensuring production of high quality molten iron of low phophorus and sulfur contents.

The furnace for carrying out the claimed process of the invention is not restricted to a particular construction, but it is preferred to have a construction as shown in FIG. 1 in which the furnace is provided with a hearth in its bottom portion under an upper space with an induction port for introducing thereinto the hot reducing gas from the precombustor. This is because there should be provided an ample space to combust the reducing gas from the precombustor sufficiently within the smelting reduction furnace to utilize the resulting heat for smelting and reduction of the iron oxide material.

Figure 12:
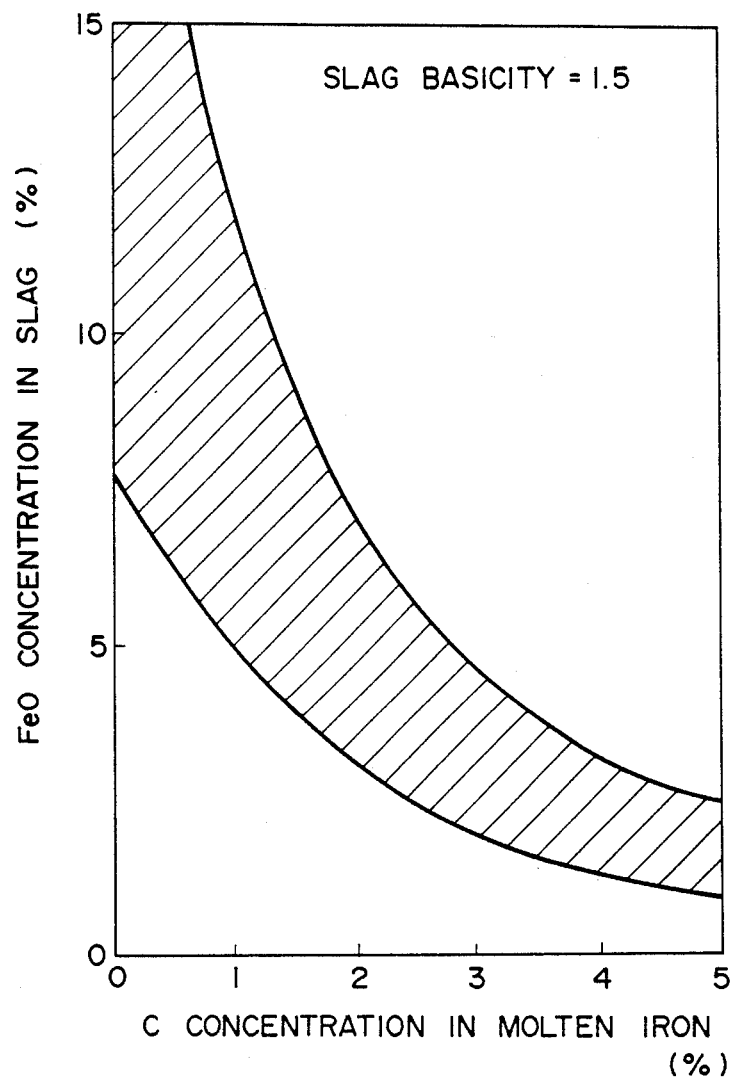
FIG. 12 is a diagram showing C concentration in molten iron in smelting reduction furnace in relation with FeO concentration in slag.

The carbon concentration in the product molten iron can be controlled over a wide range by adjusting the carbon supply to the molten iron at the hearth of the furnace. The diagram of FIG. 12 shows the relationship between the carbon concentration in the molten iron FeO concentration in the slag. The FeO concentration in the slag increases as the carbon concentration in the molten iron drops. In order to have an FeO concentration of 2-10%, it is desirable to add carbon in such a manner as to hold the carbon concentration in the molten iron in the range of 1.5% to 5%. For addition of carbon to the molten iron, it is suitable to employ a method of injecting powdery coal or coke entrained on streams of nitrogen gas, inert gas or air into the molten iron bath.

EXAMPLES

Example of the invention is hereafter described with reference to the drawings. Compositions of coal and iron ore used in this example are shown in Tables 1 and 2. Gas compositions and gas temperatures at major points of flowsheets of the example and comparative example are all shown in Table 3.

Figure 13:
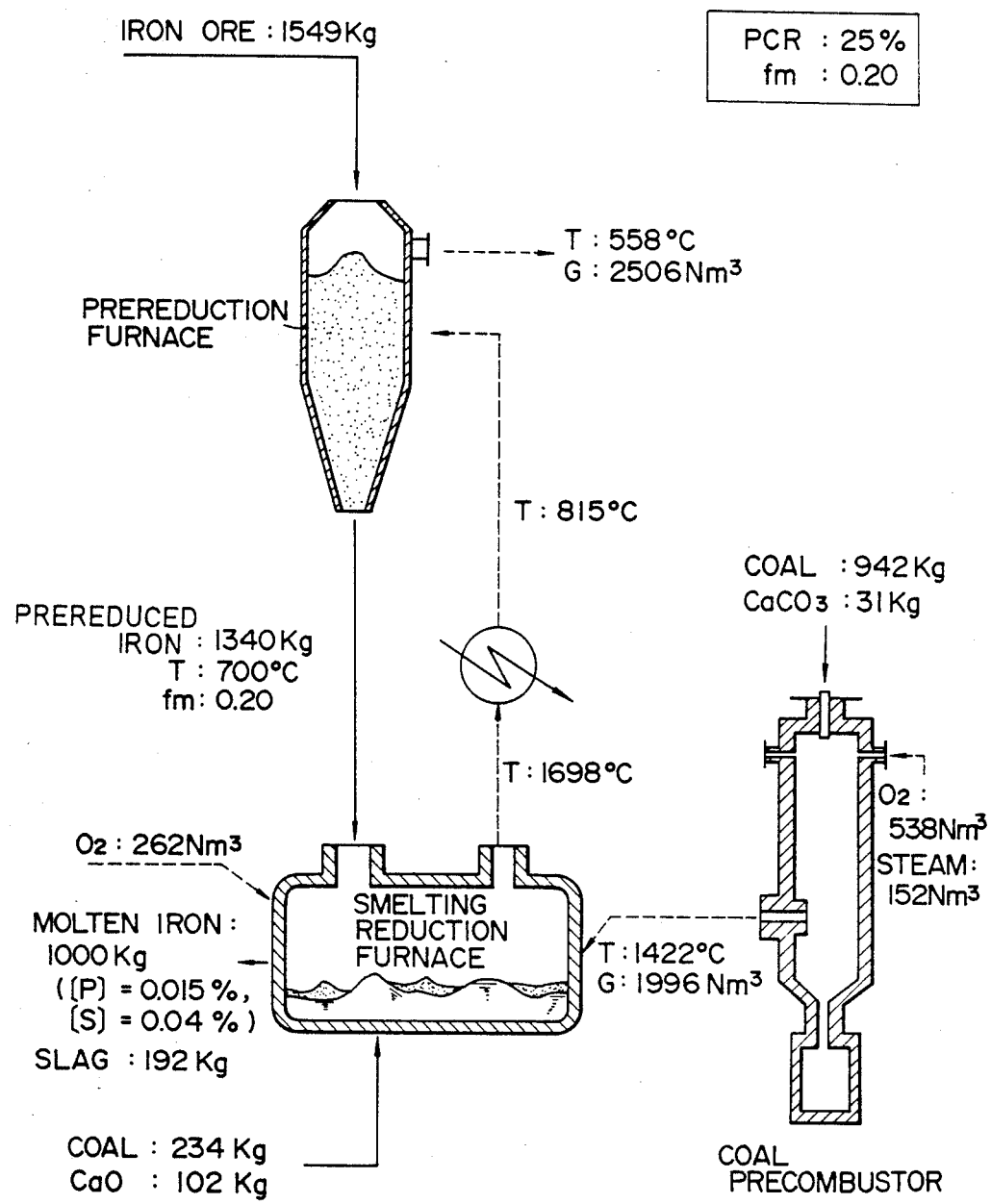
FIG. 13 is a flowchart of an example of the invention.

Illustrated in FIG. 13 is a flowsheet in which the process of the invention is applied to a once-through type smelting reduction apparatus. Including steam (152 Nm') for adjusting the temperature when introducing the reducing gas into the smelting reduction furnace (SRF), coal (942 kg/T), oxygen (538 Nm') are limestone (31 kg/T) blown into the precombustor to obtain reducing gas (1996 Nm') of 1422° C. Along with thhe reducing gas, coal (234 kg/T) is blown into the smelting reduction furnace for carburization and final reduction of prereduced iron, and further oxygen (262 Nm') for secondary combustion and lime (102 kg/T) were charged to produce pig iorn. The amount of slag in this case is 192 kg/T. The exhaust gas from the smelting reduction furnace was led to the prereduction furnace after cooling, in the same manner as in Example 1, and the prereduced iron (metallization factor fm=0.20, consumption=1340 kg/T) which has been partially reduced by the exhaust gas is charged into the smelting reduction furnace.

Figure 14:
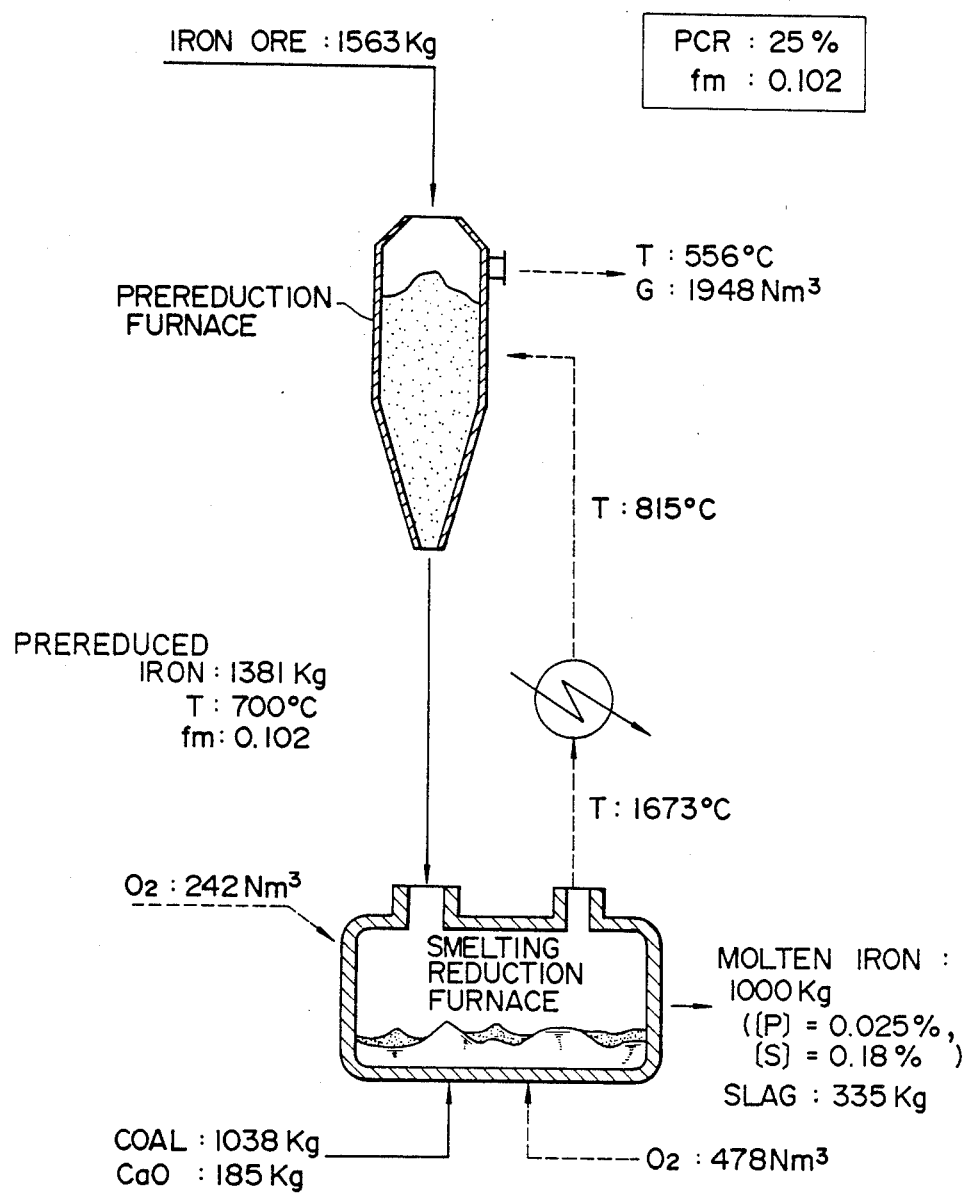
FIG. 14 is a flowchart of an example adopted for comparison.

Shown in FIG. 14 is a flowsheet of a Comparative Example, in which coal (1,038 kg/T), lime (185 kg/T), oxygen (478 Nm'/T) and oxygen (242 Nm'/T) for secondary combustion were blown into the smelting reduction furnace to produce 1 ton of pig iron. In this instance, the slag amounted to as much as 335 kg/T. Similarly to Example 1, the exhaust gas from the smelting reduction furnace was led to the prereduction furnace after cooling, and the reduced iron which has been partially reduced by the reducing gas was charged into the smelting reduction furnace.

The effects of reducing the consumption of coal and the amount of slag in this example are 73 kg/T and 143 kg/T, respectively. The amount of coal to be blown into the molten iron in the smelting reduction furnace is reduced markedly to about 1/5 of the amount in the comparative example, lessening the load of blowing. Total consumption of coal of this example is slightly larger than in the comparative example. This is because, by the addition of steam to the precombustor, the extra energy which is carried away out of the system as latent heat of hydrogen is increased. However, the energy which is used purely in the system is reduced to an extent corresponding to the reduction in sensible heat of the slag. In addition, the process of the invention permits to produce high quality pig iron with low P and S levels which are 0.015% and 0.04%, respectively, in this example of the invention, in contrast to 0.025% and 0.18% of the comparative example.

TABLE 1

| C | H | N | O | S | VM | Ash | H$_2$O |
|---|---|---|---|---|----|-----|--------|
| 76.4 | 4.3 | 1.7 | 7.2 | 0.6 | 33.0 | 9.1 | 1.0 |

TABLE 2

| T. Fe | CaO | SiO$_2$ | MgO | P$_2$O$_5$ | S | Al$_2$O$_3$ |
|-------|-----|---------|-----|------------|---|-------------|
| 67.4 | 0.01 | 1.89 | 0.01 | 0.064 | 0.009 | 0.81 |

TABLE 3

| | | CO (%) | CO$_2$ (%) | H$_2$ (%) | H$_2$O (%) | N$_2$ (%) | Temp. (°C.) |
|---|---|--------|------------|-----------|------------|-----------|-------------|
| Ex. 1 | PC Outlet | 63.9 | 1.2 | 28.9 | 1.4 | 4.4 | 1422 |
| | SRF Outlet | 47.0 | 17.4 | 25.0 | 5.7 | 4.9 | 1698 |
| | PRF Outlet | 39.0 | 25.3 | 21.9 | 8.8 | 5.0 | 558 |

PC: Precombustor, SRF: Smelting Reduction Furnace, PRF: Prereduction Furnace

EFFECTS OF THE INVENTION

The present invention, with the above-described configuration, has excellent effects as follows.

(1) Most of the ash content of the solid carbonaceous material is removed in the precombustor, so that it becomes possible to reduce markedly the consumption of lime to be charged into the smelting reduction furnace as well as the amount of slag, lessening the operational load of the smelting reduction furnace and the problem of slag treatment to a condiserable extent.

(2) The solid carbonaceous material is blown into the iron bath only in a small amount which is necessary for the carbonization and the final reduction of the prereduced iron, in contrast to the conventional process which require blowing of a large amount of carbonaceous material. Consequently, the burden in maintenance of the blowing equipments can be lessened to a significant degree.

(3) The sulfur content in the solid carbonaceous material is removed by adding a Ca-containing substance to the precombustor, and slag suitable for dephosphorization is formed in the smelting reduction furnace, permitting to produce economically high quality molten iron of low phosphorus and sulfur levels.

What is claimed is:

1. A smelting reduction process with a smelting reduction furnace and a precombustor, the precombustor having an upper portion and a lower portion thereon, for smelting and reducing an iron oxide material by introducing the said iron oxide material into a smelting reduction furnace together with a solid carbonaceous material, a fluxing agent and an oxygen-containing gas, said process comprising the steps of:
   supplying primary air to the upper portion of said precombustor as a swirling flow in an amount of 0.4 to 9.0 of the stoichiometric air amount;
   injecting pulverized carbonaceous material into the precombustor from the upper portion of said precombustor to generate high temperature reducing gas and combustion residue ash or slag;
   separating the resulting reducing gas from the combustion residue ash or slag of said solid carbonaceous material at the lower portion of the precombustor; and
   introducing said reducing gas into said smelting reduction furnace at a temperature of at least 1410° C. to effect secondary combustion while introducing a separate supply of oxygen-containing gas for smelting and reducing said iron material.

2. The smelting reduction process of claim 1, wherein said pulverized carbonaceous material is coal or coke.

3. The smelting reduction process of claim 1, wherein said carbonaceous material contains S, and wherein a Ca containing material selected from lime and limestone is added as a desulfurizing agent to said solid carbonaceous material introduced into said pecombustor for primary combustion, holding the molar ratio of Ca in said desulfurizing agent to S in said carbonaceous material (Ca/S) to 1 to 3, and separating said Ca containing material from said reducing gas.

4. The smelting reduction process of claim 1, wherein said oxygen-containing gas is composed of pure oxygen, oxygen-enriched air or preheated air added with or without steam, controlling the oxygen concentration, preheating temperature and additive amount of steam in such a manner as to hold the reducing gas temperature to 700°–1500° C.

5. The smelting reduction process of claim 1, wherein said slag contains CaO, $SiO_2$ and FeO and wherein the basicity calculated as (% CaO/% $SiO_2$) of the slag produced in said smelting reduction furnace is controlled to a range of from 0.8 to 2.5, and the FeO concentration in said slag is controlled to a range of from 2–10%.

6. The smelting reduction process of claim 1, wherein said smelting reduction furnace has an upper portion and a bottom portion thereof, and is provided with a hearth portion in the bottom portion thereof to hold molten iron, and an inlet port in the upper portion thereof over said hearth portion for introducing thereinto said reducing gas produced in said precombustor.

7. The smelting reduction process of claim 6, wherein said molten iron in the hearth portion of said smelting reduction furnace is carbonized, holding the carbon concentration to a range of from 1.5% to 5%.

8. The smelting reduction process of claim 6, wherein powdery coal or coke is blown into the molten iron in said hearth portion of said smelting reduction furnace, entraining said powdery coal or coke on nitrogen gas, inert gas or air streams.

* * * * *

UNITED STATES PATENT AND TRADEMARK OFFICE
CERTIFICATE OF CORRECTION

PATENT NO. : 4,957,545

DATED : SEPTEMBER 18, 1990

INVENTOR(S) : AKIHIDE HIKOSAKA ET AL.

It is certified that error appears in the above-identified patent and that said Letters Patent is hereby corrected as shown below:

On the title page:
In the Assignee, please delete "Kabushiki kaisha Kobe Seiko Shoe" and insert --Kabushiki Kaisha Kobe Seiko Sho--.

Signed and Sealed this

Thirtieth Day of June, 1992

Attest:

DOUGLAS B. COMER

*Attesting Officer*  *Acting Commissioner of Patents and Trademarks*